(12) United States Patent
Chen (10) Patent No.: US 6,857,385 B1
(45) Date of Patent: Feb. 22, 2005

(54) FOLDABLE ROAD WARNING DEVICE

(76) Inventor: Yi Hui Chen, P.O. Box 10-69, Chong Ho, Taipei (TW)

( * ) Notice: Subject to any disclaimer, the term of this patent is extended or adjusted under 35 U.S.C. 154(b) by 0 days.

(21) Appl. No.: 10/387,720

(22) Filed: Mar. 11, 2003

(51) Int. Cl.[7] .......................... E01F 9/012; E01F 9/016
(52) U.S. Cl. ..................... 116/63 T; 116/63 P; 40/610; 40/903
(58) Field of Search ............................ 116/63 T, 63 C, 116/63 P, 63 R; 40/591, 610, 612, 431, 606.15, 903; D10/109, 111, 113; 404/6, 9

(56) References Cited

U.S. PATENT DOCUMENTS

| | | | | |
|---|---|---|---|---|
| D196,158 S | * | 8/1963 | Romano | D10/109 |
| 3,135,235 A | * | 6/1964 | Romano | 116/63 R |
| D219,846 S | * | 2/1971 | Sernovitz | D10/109 |
| 3,593,681 A | * | 7/1971 | Sernovitz | 116/63 P |
| 3,742,897 A | * | 7/1973 | Meek et al. | 116/63 P |
| 3,759,214 A | * | 9/1973 | Evans et al. | 116/63 P |
| 3,822,668 A | * | 7/1974 | Schradieck et al. | 116/63 P |
| 3,911,854 A | * | 10/1975 | Manuel | 116/63 P |
| 3,933,119 A | * | 1/1976 | Hedgewick et al. | 116/63 P |
| 3,934,541 A | * | 1/1976 | May et al. | 116/63 T |
| 3,934,542 A | * | 1/1976 | May et al. | 116/63 P |
| D240,515 S | * | 7/1976 | Crompton et al. | D10/111 |
| D311,148 S | * | 10/1990 | Yuen | D26/114 |
| 5,287,822 A | * | 2/1994 | Anderson | 116/63 P |
| D409,515 S | * | 5/1999 | Chen | D10/109 |
| 5,927,676 A | * | 7/1999 | Lefton | 248/472 |
| 5,970,639 A | * | 10/1999 | Hui | 40/610 |
| 6,149,339 A | * | 11/2000 | Salloum et al. | 404/6 |
| 6,543,165 B2 | * | 4/2003 | Youseph et al. | 40/610 |

* cited by examiner

*Primary Examiner*—Christopher W. Fulton
*Assistant Examiner*—R. Alexander Smith (57) ABSTRACT

A road warning device includes a board having a lower housing, a casing rotatably secured to the housing with a shaft and rotatable into and out of a chamber of the housing. A plate is selectively and detachably attached to the casing and moveable in concert with the casing, and rotatable toward a folding position to engage with the board, and rotatable away from the board and toward a working position. The plate includes one or more reflective members and one or more light members for lighting purposes. The casing may include one or more weights to increase the weight of the casing.

11 Claims, 8 Drawing Sheets

FOLDABLE ROAD WARNING DEVICE

BACKGROUND OF THE INVENTION

1. Field of the Invention

The present invention relates to a road warning device, and more particularly to a foldable road warning device having a light device.

2. Description of the Prior Art

Figure 8:
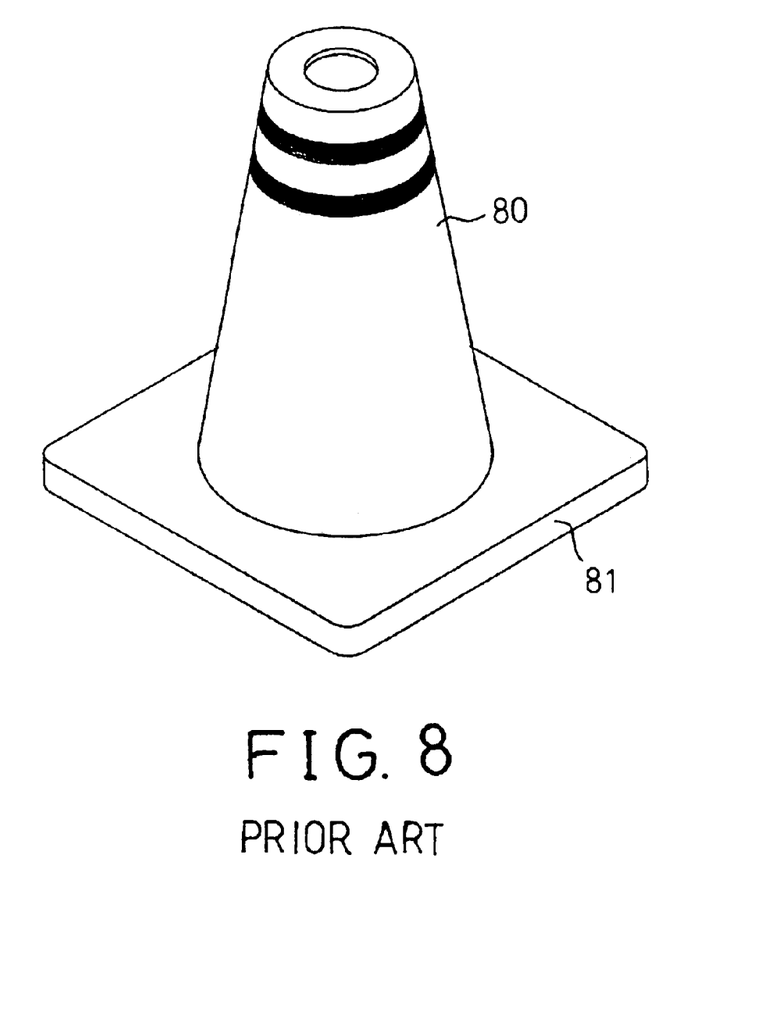
FIG. 8 is a perspective view illustrating a typical road warning device.

Typical road warning devices have been developed and provided for warning purposes. For example, as shown in FIG. 8, illustrated is a typical road warning device 80 which comprises a planar base 81 for being supported on the supporting surfaces or ground or the like.

However, the typical road warning device comprises a great volume that may not be folded to compact configurations, such that the typical road warning device is not good for transportation or storing purposes.

The other typical warning triangles have been developed and provided for attaching to vehicles and for warning purposes. Some of the typical warning triangles may comprise a foldable structure that may be folded to compact configurations.

However, the typical warning triangles comprise a simple triangular structure and having a stay for supporting the triangles. The triangles is not stable and may easily fall in windy days. In addition, the typical warning triangles normally comprise one or more reflective members or layers applied thereon for light reflecting purposes, but do not include light devices for generating light.

The present invention has arisen to mitigate and/or obviate the afore-described disadvantages of the conventional road warning devices.

SUMMARY OF THE INVENTION

The primary objective of the present invention is to provide a foldable road warning device including a foldable structure for allowing the road warning device to be folded to a compact structure or configuration that is good for transportation or storing purposes.

The other objective of the present invention is to provide a foldable road warning device including one or more light devices for generating warning lights.

In accordance with one aspect of the invention, there is provided a road warning device comprising a board including a lower portion having a housing provided thereon, the housing including a chamber formed therein, a casing rotatably secured to the housing of the board with a shaft, and rotatable into the chamber of the housing, and rotatable out of the chamber of the housing, and at least one plate attached to the casing and moved in concert with the casing, and rotatable toward a folding position to engage with the board, and rotatable toward a working position and away from the board.

The casing includes at least one lock notch formed therein, the plate includes a catch extended therefrom and engageable into the lock notch of the casing, in order to detachably secure the plate to the casing.

The plate includes at least one reflective member applied thereon for light reflecting purposes. The plate may further include at least one light member attached thereto for light generating purposes.

The casing includes at least one aperture formed therein, and at least one battery received in the casing, the plate includes at least one electric wire engaged through the aperture of the casing, to electrically couple the light member to the battery of the casing.

The casing includes a magnetic switch provided therein to actuate and energize the light member when the plate and the casing are rotated relative to the housing toward the working position, and to switch off the light member when the plate and the casing are rotated relative to the housing toward the folding position.

The casing includes a manual switch provided thereon to selectively switch on and off the light member.

The housing includes the shaft attached thereto, the casing includes a hub provided thereon to rotatably receive the shaft, and to rotatably secure the casing to the housing. The housing includes at least one side panel to engage with the casing, and to limit a rotational movement of the casing relative to the housing.

The board includes a duct provided thereon, the plate includes a barrel aligned with the duct, and an axle is further provided and engaged through the duct and the barrel to rotatably secure the plate to the board. The casing includes at least one weight disposed therein, to increase a weight of the casing.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Referring to the drawings, and initially to FIGS. 1–4, a foldable road warning device in accordance with the present invention comprises a body 10 including a board 11 having a substantially triangular shape. However, the board 11 may also be formed into various kinds of shapes of contours.

Figure 1:
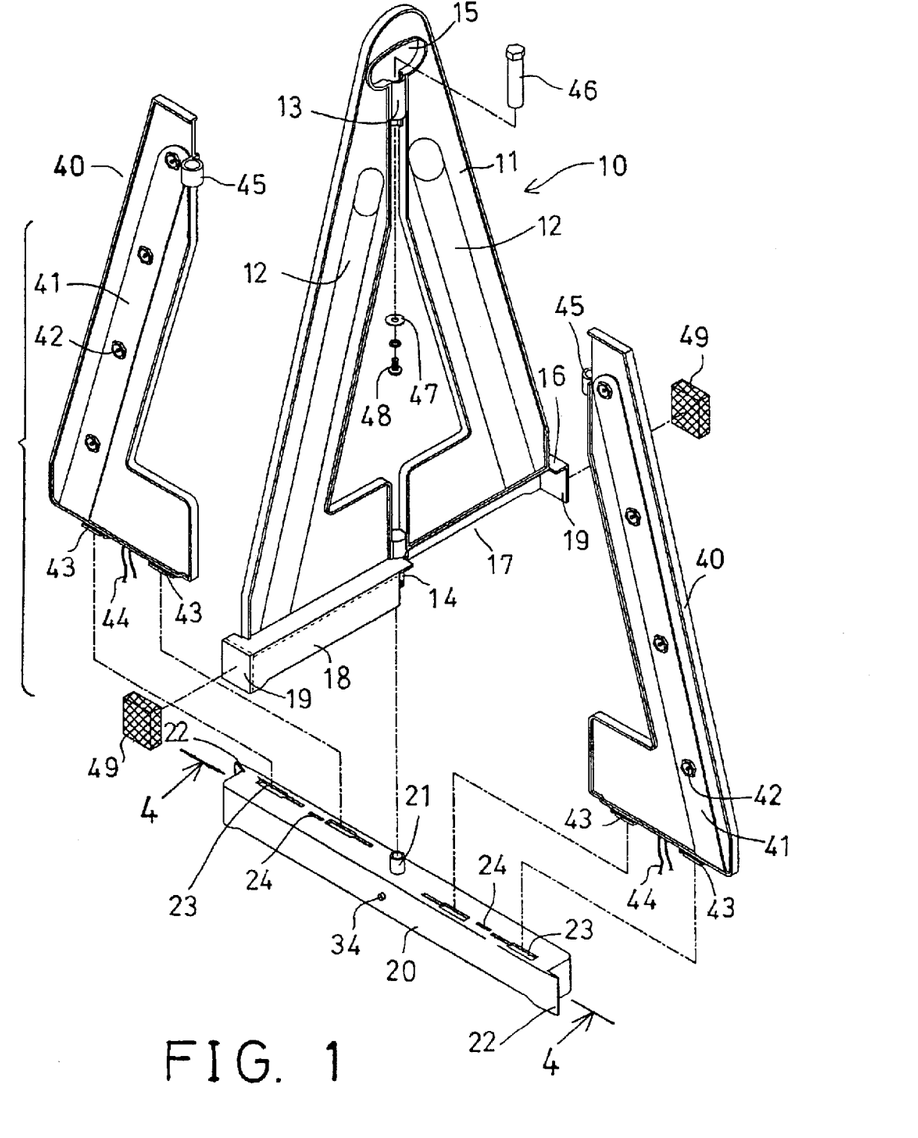
FIG. 1 is an exploded view of a foldable road warning device in accordance with the present invention.
Figure 2:
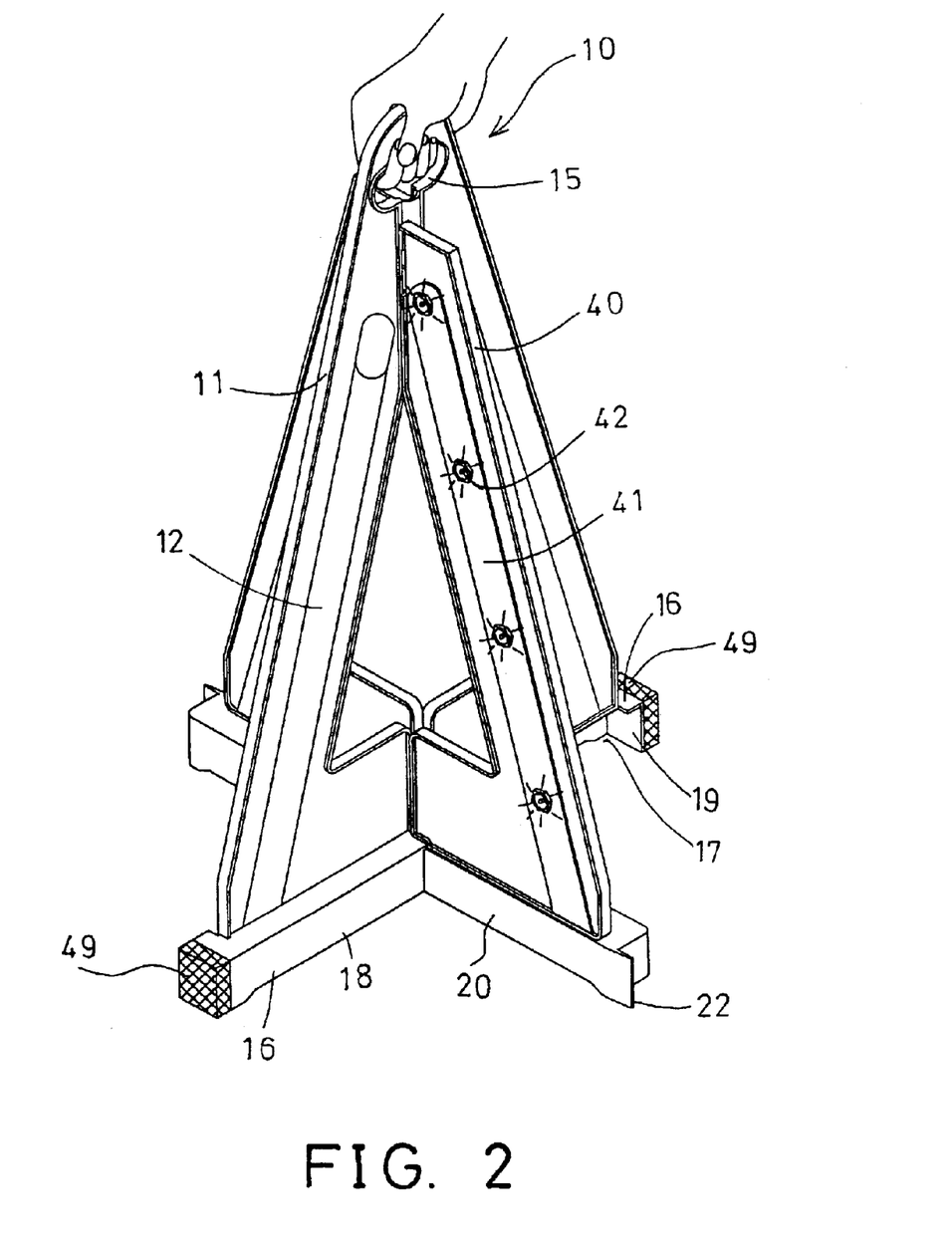
FIG. 2 is a perspective view of the foldable road warning device.
Figure 3:
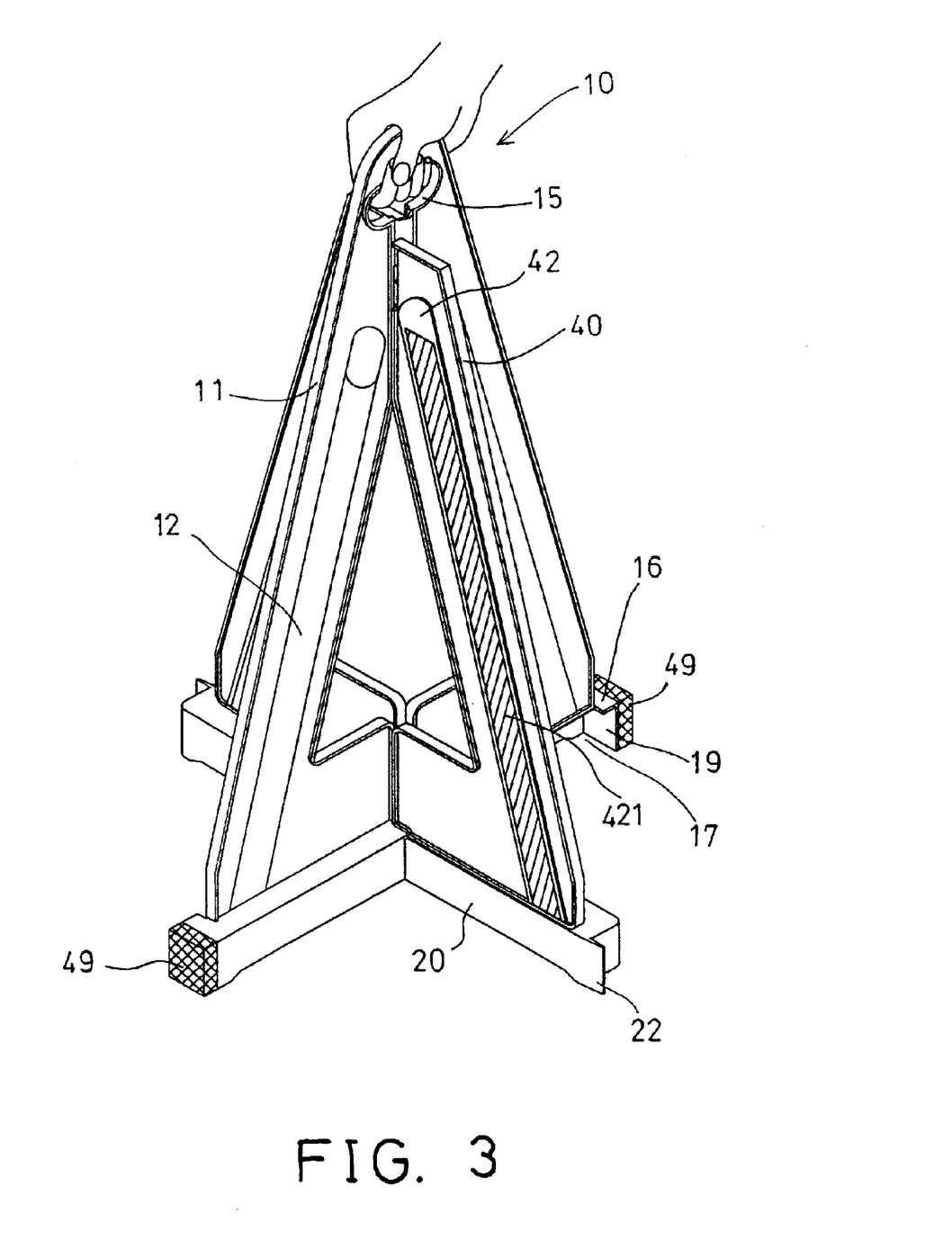
FIG. 3 is a perspective view similar to FIG. 2, illustrating the inner structure of the foldable road warning device.
Figure 5:
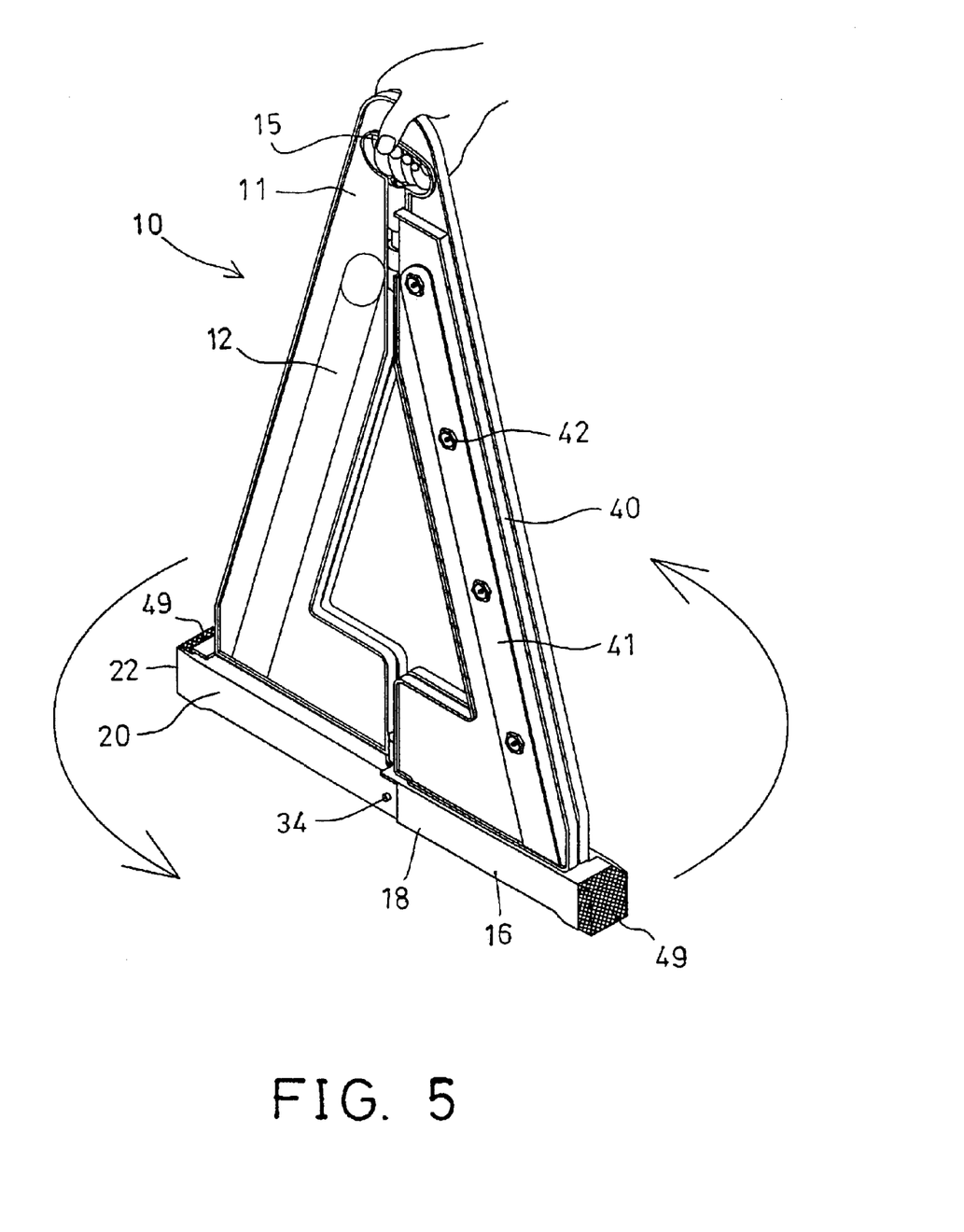
FIG. 5 is a perspective view illustrating the folding operation of the foldable road warning device.

The board 11 includes one or more reflective members or layers 12 applied thereon for light reflecting purposes, and includes a duct 13 provided in the middle and upper portion thereof, a shaft 14 provided in the middle and lower portion thereof, and an opening 15 formed in the upper portion thereof for being used as a handle or carrying portion (FIGS. 2, 3, 5).

The board 11 includes a housing 16 formed or provided on the bottom portion thereof, and having a chamber 17 formed therein, the shaft 14 is extended into the chamber 17 of the housing 16. The housing 16 includes one or more side panels 18 and two end panels 19 for forming or defining the chamber 17 thereof.

A bar or casing 20 includes a hub 21 rotatably receiving or engaging with the shaft 14 of the board 11, for pivotally or rotatably securing the casing 20 to the housing 16 of the board 11. The casing 20 is rotatable into and receivable in the chamber 17 of the housing 16, and engageable with the side panels 18 which may thus limit the rotational movement of the casing 20 relative to the housing 16.

The casing 20 further includes one or more end extensions 22 extended from the ends thereof, to engage with the end panels 19 of the housing 16, and to further limit the rotational movement of the casing 20 relative to the housing 16, and to retain the casing 20 in the chamber 17 of the housing 16.

The casing 20 includes one or more lock notches 23 and one or more apertures 24 formed in the upper portion thereof, and includes a number of catches 25 provided in the inner portion thereof (FIG. 4), in order to catch or secure one or more weights 26 in the casing 20, and so as to increase the stability of the casing 20 and thus the board 11 and the housing 16.

Figure 4:
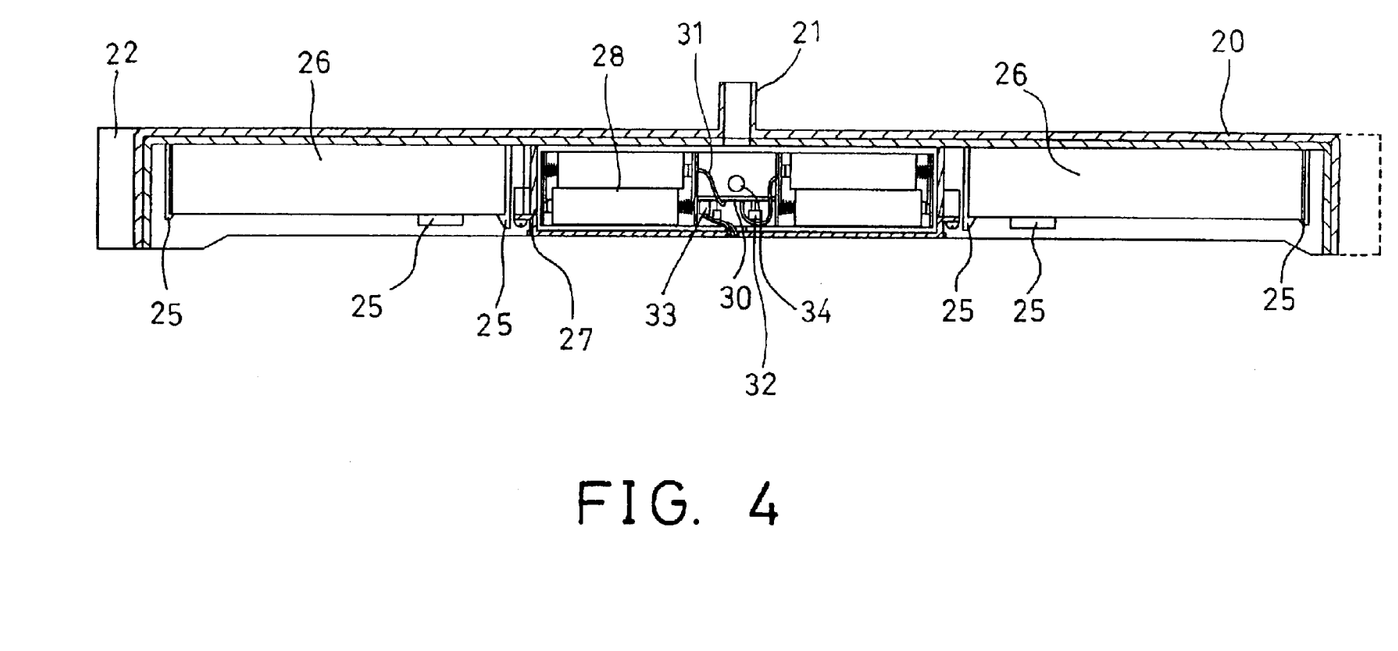
FIG. 4 is a partial cross sectional view taken along lines 4—4 of FIG. 1.

As also shown in FIG. 4, the casing 20 includes a receptacle 27 formed or provided in the inner portion thereof, to receive or retain one or more batteries 28 and a circuit board 30 therein, the circuit board 30 includes one or more electric elements 32, such as processor units 32 coupled to the batteries 28 with such as electric wires 31 or the like.

The circuit board 30 includes a electromagnetic or magneto or magnetic switch 33 coupled thereto, and a manual switch 34 coupled thereto for operating or actuating the circuit board 30, or for switching on and off the electric elements 32 of the circuit board 30.

As shown in FIGS. 1, 2 and 5–7, one or more, such as two plates 40 are further provided and each may include one or more reflective members or layers 41 applied thereon for light reflecting purposes, and/or one or more light members 42 attached thereto for warning light generating purposes. As shown in FIG. 3, the plates 40 may each further include one or more illuminant members or layers 421 applied thereon for warning light generating purposes.

The plates 40 each may include one or more catches 43 extended or provided on the bottom portion thereof, for engaging into the lock notches 23 of the casing 20, and for detachably securing the plates 40 to the casing 20; and each may include one or more electric wires 44 engaged through the apertures 24 of the casing 20, for electrically coupling the light members 42 to the circuit board 30 of the casing 20. The plates 40 may be moved in concert with the casing 20 when the plates 40 are secured to the casing 20 with the catches 43.

The plates 40 each may further include a barrel 45 provided on the upper portion thereof, and aligned with the duct 13 of the board 11. An axle 46 is engageable through the duct 13 of the board 11 and the barrels 45 of the plates 40, for rotatably securing the plates 40 to the board 11, and thus for allowing the plates 40 to be rotated toward or to engage with the board 11 (FIG. 5), or to be rotated away from the board 11 (FIGS. 2, 3) to form a stable pyramid structure. A washer 47 may further be provided and engaged onto the axle 46, and a fastener 48 may be threaded to the axle 46 and engaged with the barrels 45, to stably and rotatably secure the axle 46 to the barrels 45.

As shown in FIGS. 2, 3, 5, the plates 40 may form, altogether, a triangular shape similar to or corresponding to that of the board 11, and may be rotated relative to the board 11 between a folding or receiving position (FIG. 5) and an opening or working position (FIGS. 2, 3).

The board 11 and the plates 40 may form a compact triangular shape together when the plates 40 are rotated to engage with the board 11 at the folding or receiving position (FIG. 5), and may form the stable pyramid structure when the plates 40 are rotated away from the board 11 at the opening or working position (FIGS. 2, 3). One or more pads 49 may be attached to the ends or the bottoms of the housing 16, for engaging with the supporting surfaces or ground or the like.

The electromagnetic or magneto or magnetic switch 33 of the circuit board 30 is provided for electrically coupling or for switching on the light members 42 when the plates 40 are rotated to engage with the board 11 at the folding or receiving position (FIG. 5), in order to energize or operate the light members 42; and for switching off the light members 42 when the plates 40 are rotated away from the board 11 at the opening or working position (FIGS. 2, 3).

Instead of the electromagnetic or magneto or magnetic switch 33 of the circuit board 30, the manual switch 34 may be provided for operating or actuating the circuit board 30, or for switching on and off the electric elements 32 of the circuit board 30 or the light members 42 manually by the users.

Figure 6:
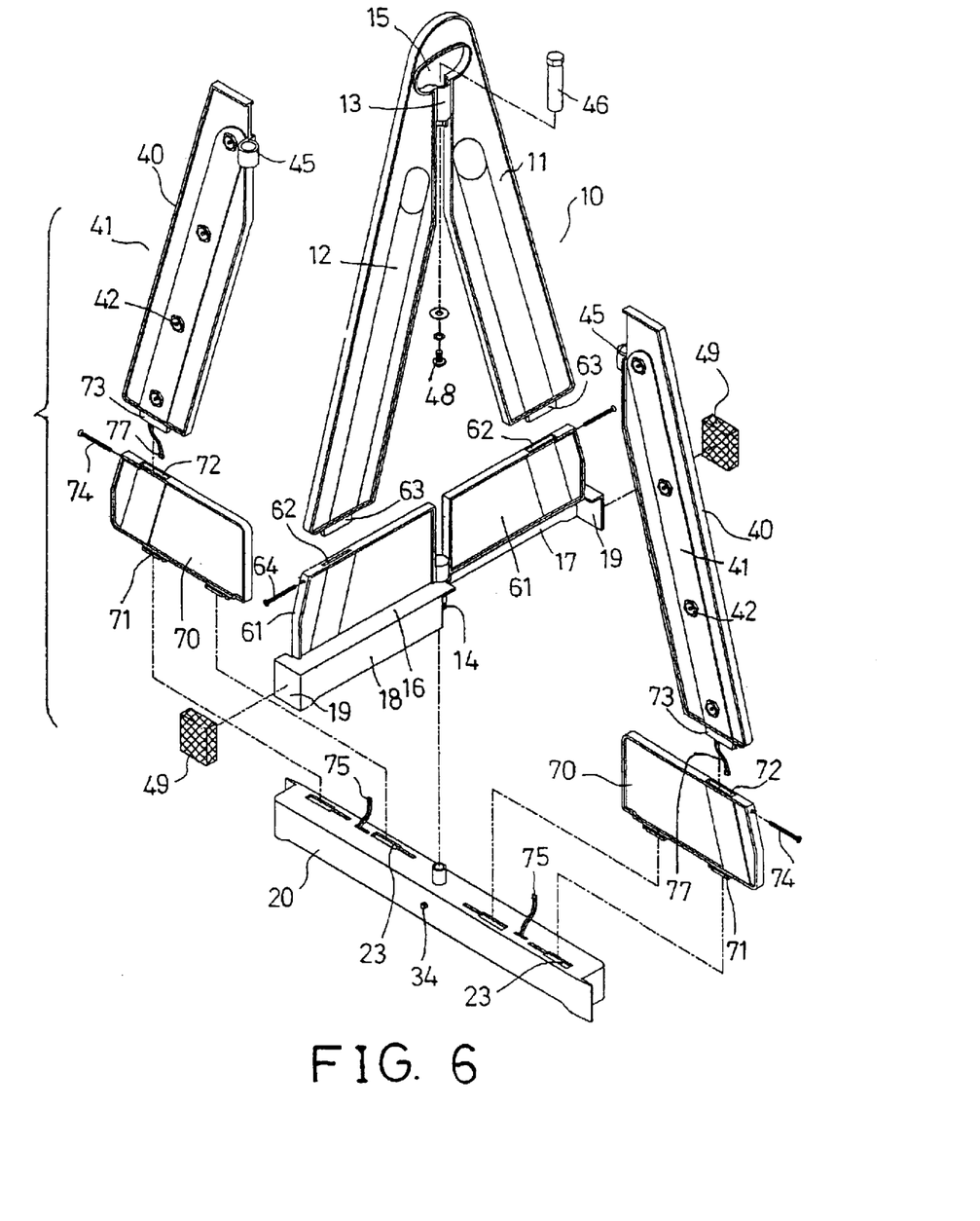
FIG. 6 is an exploded view similar to FIG. 1, illustrating the other arrangement of the foldable road warning device.
Figure 7:
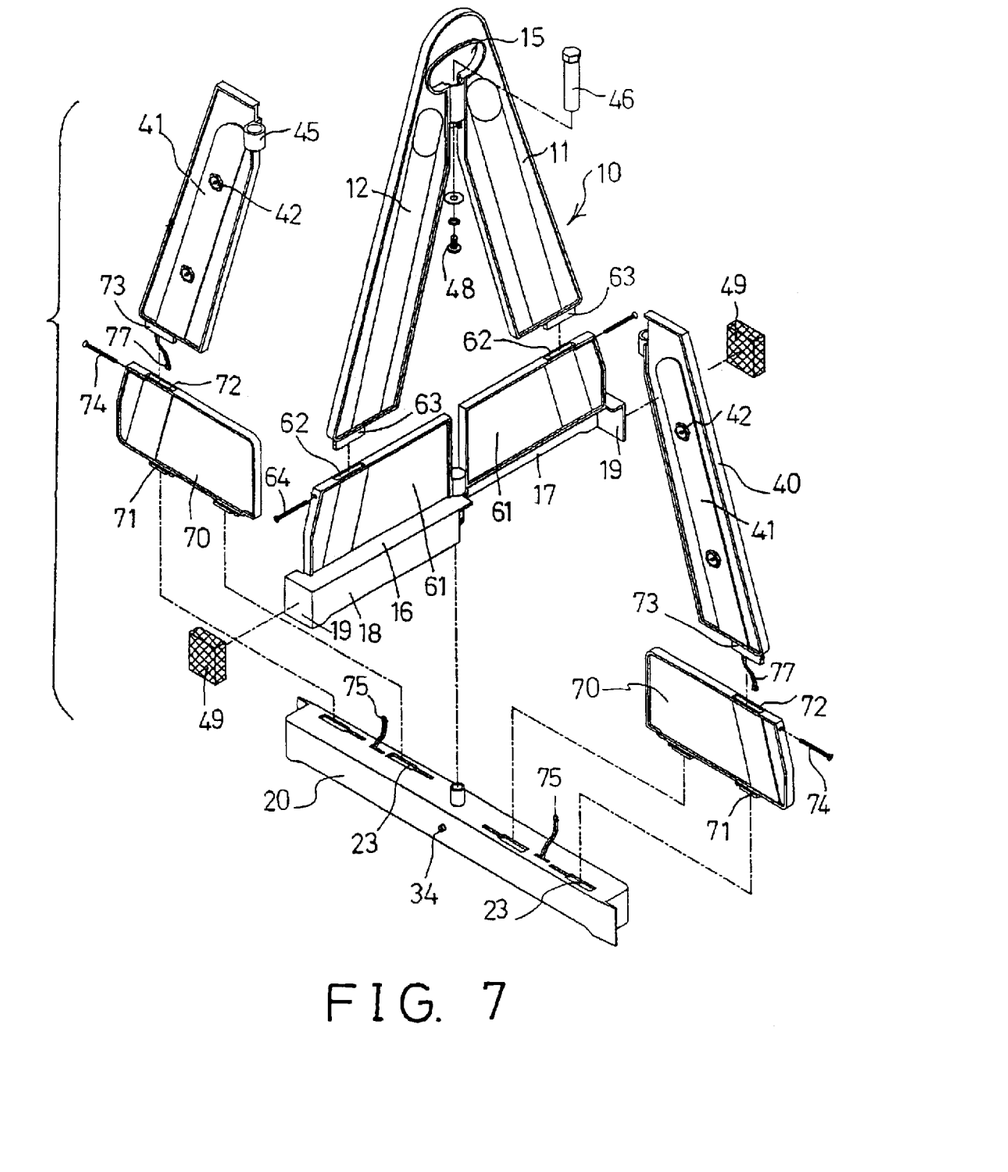
FIG. 7 is an exploded view similar to FIGS. 1 and 6, illustrating a further arrangement of the foldable road warning device.

Alternatively, as shown in FIGS. 6 and 7, the body 10 may include one or more bases 61 secured on the housing 16, and the bases 61 each may include one or more passages 62 formed therein for receiving protrusions 63 of the board 11. The protrusions 63 of the board 11 may further be secured to the bases 61 with fasteners 64 or the like.

The plates 40 may also each include a base 70 having one or more catches 71 for engaging into the lock notches 23 of the casing 20, and for detachably securing the bases 70 to the casing 20, and the bases 70 each may include one or more passages 72 formed therein for receiving protrusions 73 of the plates 40. The protrusions 73 of the plates 40 may further be secured to the bases 70 with fasteners 74 or the like.

The plates 40 may each include one or more electric wires or cables 77 for coupling to the corresponding electric wires or cables 75 of the casing 20, and thus for electrically coupling the light members 42 to the circuit board 30 of the casing 20. The board 11 and/or the plates 40 as shown in FIG. 6 may include a greater height or width or a different shape from that shown in FIG. 7, for allowing the board 11 and/or the plates 40 of different shapes or heights or widths to be selectively secured or assembled to the housing 16 and the casing 20.

Accordingly, the foldable road warning device in accordance with the present invention includes a foldable structure for allowing the road warning device to be folded to a compact structure or configuration that is good for transportation or storing purposes, and includes one or more light devices for generating warning lights, when required.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:
1. A road warning device comprising:
   a board including a lower portion having a housing provided thereon, said housing including a chamber formed therein, a casing rotatably secured to said housing of said board with a shaft, and rotatable into said chamber of said housing, and rotatable out of said chamber of said housing, and at least one plate attached to said casing and moved in concert with said casing, and rotatable toward a folding position to engage with said board, and rotatable toward a working position and away from said board.

2. The road warning device as claimed in claim 1, wherein said casing includes at least one lock notch formed therein, said at least one plate includes a catch extended therefrom and engageable into said at least one lock notch of said casing, in order to detachably secure said at least one plate to said casing.

3. The road warning device as claimed in claim 1, wherein said at least one plate includes at least one reflective member applied thereon for light reflecting purposes.

4. The road warning device as claimed in claim 1, wherein said at least one plate includes at least one light member attached thereto for light generating purposes.

5. The road warning device as claimed in claim 4, wherein said casing includes at least one aperture formed therein, and at least one battery received in said casing, said at least one plate includes at least one electric wire engaged through said at least one aperture of said casing, to electrically couple said at least one light member to said at least one battery of said casing.

6. The road warning device as claimed in claim 4, wherein said casing includes a magnetic switch provided therein to actuate and energize said at least one light member when said at least one plate and said casing are rotated relative to said housing toward said working position, and to switch off said at least one light member when said at least one plate and said casing are rotated relative to said housing toward said folding position.

7. The road warning device as claimed in claim 4, wherein said casing includes a manual switch provided thereon to selectively switch on and off said at least one light member.

8. The road warning device as claimed in claim 1, wherein said housing includes said shaft attached thereto, said casing includes a hub provided thereon to rotatably receive said shaft, and to rotatably secure said casing to said housing.

9. The road warning device as claimed in claim 1, wherein said housing includes at least one side panel to engage with said casing, and to limit a rotational movement of said casing relative to said housing.

10. The road warning device as claimed in claim 1, wherein said board includes a duct provided thereon, said at least one plate includes a barrel aligned with said duct, and an axle is further provided and engaged through said duct and said barrel to rotatably secure said at least one plate to said board.

11. The road warning device as claimed in claim 1, wherein said casing includes at least one weight disposed therein, to increase a weight of said casing.

* * * * *